(12) United States Patent
Pullaro, Jr. et al.

(10) Patent No.: US 9,527,335 B2
(45) Date of Patent: Dec. 27, 2016

(54) COUNTER PEN

(71) Applicants: Raymond Pullaro, Jr., Rockville Center, NY (US); Vadim Gordin, Mineola, NY (US)

(72) Inventors: Raymond Pullaro, Jr., Rockville Center, NY (US); Vadim Gordin, Mineola, NY (US)

( * ) Notice: Subject to any disclaimer, the term of this patent is extended or adjusted under 35 U.S.C. 154(b) by 63 days.

(21) Appl. No.: 14/695,589

(22) Filed: Apr. 24, 2015

(65) Prior Publication Data

US 2016/0311244 A1 Oct. 27, 2016

(51) Int. Cl.
| B43K 29/08 | (2006.01) |
| G06M 1/06 | (2006.01) |
| G06F 3/0362 | (2013.01) |
| G06F 3/0346 | (2013.01) |
| H05K 5/00 | (2006.01) |

(52) U.S. Cl.
CPC ............ B43K 29/08 (2013.01); G06F 3/0346 (2013.01); G06F 3/0362 (2013.01); H05K 5/0017 (2013.01)

(58) Field of Classification Search
USPC .................................................. 235/64, 103
See application file for complete search history.

(56) References Cited

U.S. PATENT DOCUMENTS

| 2,357,940 A | 9/1944 | Lude |
| 3,120,924 A | 2/1964 | Van De Mark |
| 3,254,836 A | 6/1966 | Corpian |
| 3,617,708 A | 11/1971 | Bongiovanni |
| 3,843,047 A | 10/1974 | Otsuka |
| 4,007,364 A * | 2/1977 | Ojima .................. B43K 29/093 200/14 |
| 4,009,370 A * | 2/1977 | Otsuka .................. B43K 29/08 235/103 |
| 4,295,038 A | 10/1981 | Kreinbrink |
| 4,726,044 A | 2/1988 | Perna |
| 4,768,040 A | 8/1988 | Pipkin |
| 4,993,050 A | 2/1991 | Carpenteri |
| 5,442,380 A * | 8/1995 | McCormick ........... B43K 29/08 346/14 MR |
| 5,995,123 A | 11/1999 | McCormick |
| 6,213,954 B1 | 4/2001 | Chen |
| 7,172,358 B1 | 2/2007 | Rudelius |
| D564,385 S | 3/2008 | Worth |
| 7,760,195 B2 | 7/2010 | Byler |

* cited by examiner

Primary Examiner — Daniel Hess
(74) Attorney, Agent, or Firm — Vadim A. Gordin

(57) ABSTRACT

Electronics devices are disclosed herein operatively configured to provide a tally or count of various phenomena within an electronic record while also being capable of marking a sheet of paper with ink. These include for instance the frequency of pitches thrown among a visiting and home team in a baseball game.

15 Claims, 5 Drawing Sheets

1700

COUNTER PEN

CLAIM OF PRIORITY

This application does not claim priority to any preceding applications.

BACKGROUND/FIELD

Within the game of baseball, it is often necessary for a coach or official to keep a record of the total number of pitches thrown by a pitcher both during an inning and in the overall course of the game. At the end of each inning, the coach or official must add the tally for pitches in the current inning to the cumulative tally for a given team and start a new count for the current inning for the incoming team. These tallies are generally kept in the margins of specialized journals and notepads, but such recordkeeping is cumbersome. Toward that end, devices are provided herein for convenient tallying of pitch statistics. Although designed with baseball in mind, there are other useful implementations of the present disclosure including for instance tabulating colonies in cell culture and counting merchandise in a wholesale or retail environment.

SUMMARY

According to a first embodiment of the present disclosure, a counting pen includes an elongated pen body with a digital display visible thereupon, a rotary control element disposed near a first proximal end of the body in electronic communication with the digital display and a writing instrument disposed near a second distal end of the body wherein there are multiple active counts stored in the memory of the device which may be accessed by rotationally translating the control element into predetermined positions about its rotation relative to the body with each position corresponding to a count.

According to certain further embodiments of the present disclosure, the active count may be incremented by depressing the control element along the long axis of the body, thereby temporarily decreasing the overall length of the device.

According to certain further embodiments of the present disclosure, depressing the control element for an extended period of time resets a given count to zero.

According to certain further embodiments of the present disclosure, there is a cumulative and active count stored within the memory of the device for each given rotational position.

According to certain further embodiments of the present disclosure, both the cumulative and active count are visible upon the display.

According to certain further embodiments of the present disclosure, incrementing the counter increments both the active and cumulative count.

According to certain further embodiments of the present disclosure, rotating the controller resets the previously selected active count but not the cumulative count.

According to certain further embodiments of the present disclosure, depressing the controller for an extended period of time resets both the cumulative and active counts.

According to certain further embodiments of the present disclosure, there are longitudinal ridges disposed within the body which create a channel therebetween for slideably retaining a wet-cell battery.

According to certain further embodiments of the present disclosure, there is a solar panel disposed upon the body and in electronic communication with the body.

According to certain further embodiments of the present disclosure, there is a physical switch disposed thereupon which toggles the orientation of the display and control for right or left handed users.

According to certain further embodiments of the present disclosure, there are two limits of rotation in the travel of the rotary control between which it may be toggled.

According to certain further embodiments of the present disclosure, the display includes a backlight.

According to certain embodiments of the present disclosure, a counting pen includes an elongated pen body with a digital display visible thereupon, a rotary control element in electronic communication with the digital display disposed near a first end of the body and a writing instrument disposed near a second end of the body; wherein there are multiple active counts which may be accessed by rotationally translating the control element into one of at least two physical detents about the control element's rotation relative to the body and the control element is also a spring-loaded pushbutton which may be temporarily translated along the long axis of the body to increment the count.

According to certain further embodiments of the present disclosure, a counting pen includes an elongated pen body with a digital display visible thereupon, a multi-position control element in electronic communication with the digital display disposed near a first end of the body and a writing instrument disposed near a second end of the body; wherein there are multiple active counts which may be accessed by translating the control element into one of a plurality of physical detents about the control element's path relative to the body and there is a spring-loaded pushbutton which may be temporarily translated along the long axis of the body to increment the count.

BRIEF DESCRIPTION OF THE FIGURES

In the figures, which are not necessarily drawn to scale, like numerals describe substantially similar components throughout the several views. The drawings illustrate generally, by way of example, but not by way of limitation, various embodiments discussed in the claims of the present document.

DETAILED DESCRIPTION OF THE FIGURES

Figure 1:
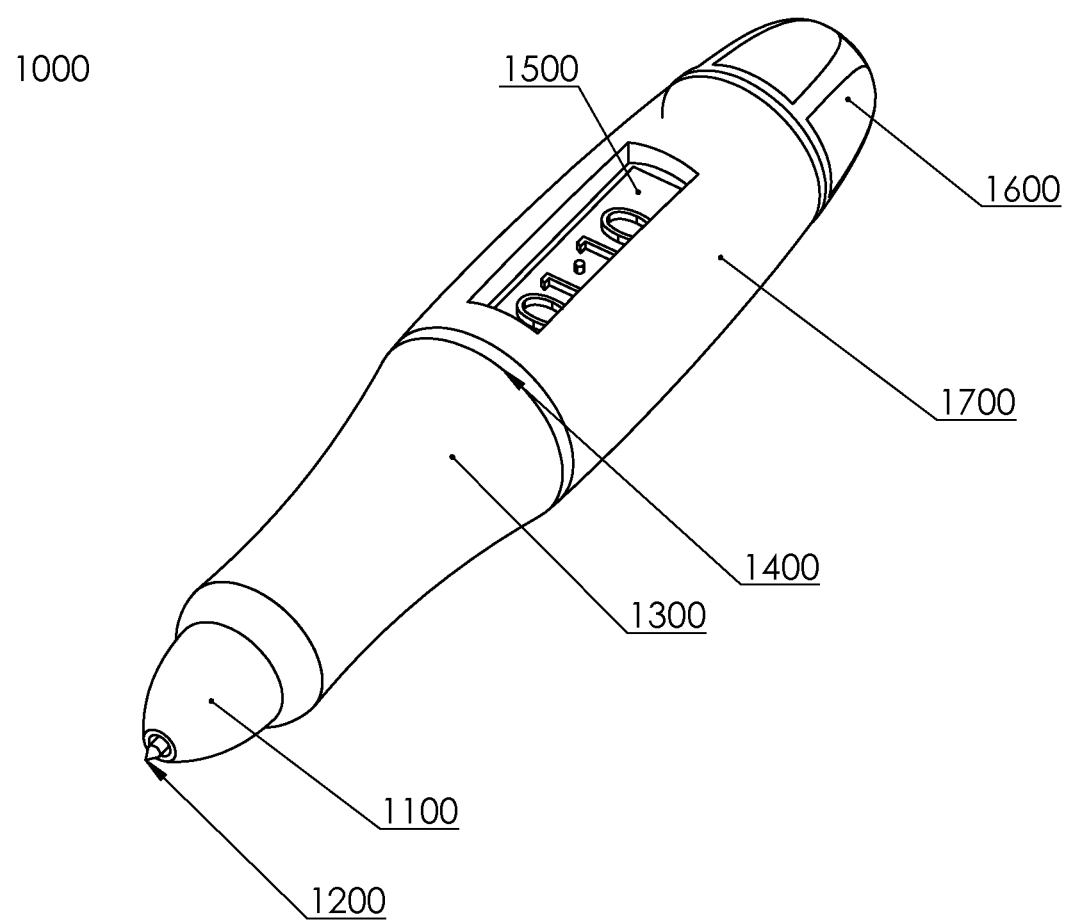
FIG. 1 shows a top isometric view of a counter pen.

Various embodiments of the presently disclosed apparatus will now be described in detail with reference to the drawings, wherein like reference numerals identify similar or identical elements. In the drawings and in the description that follows, the term "proximal," will refer to the end of a device or system that is closest to the operator, while the term "distal" will refer to the end of the device or system that is farthest from the operator. Similar, anatomical terms of reference such as dorsal, lateral, anterior, and sagittal shall have their accepted meanings in the arts.

Referring now to FIG. 1 thereof, a counter pen woo includes a nose cone 1100, a pen cartridge 1200, a grip 1300, a grip body 1400, a circuit board 1500, a knob 1600, and a pen body 1700.

Figure 2:
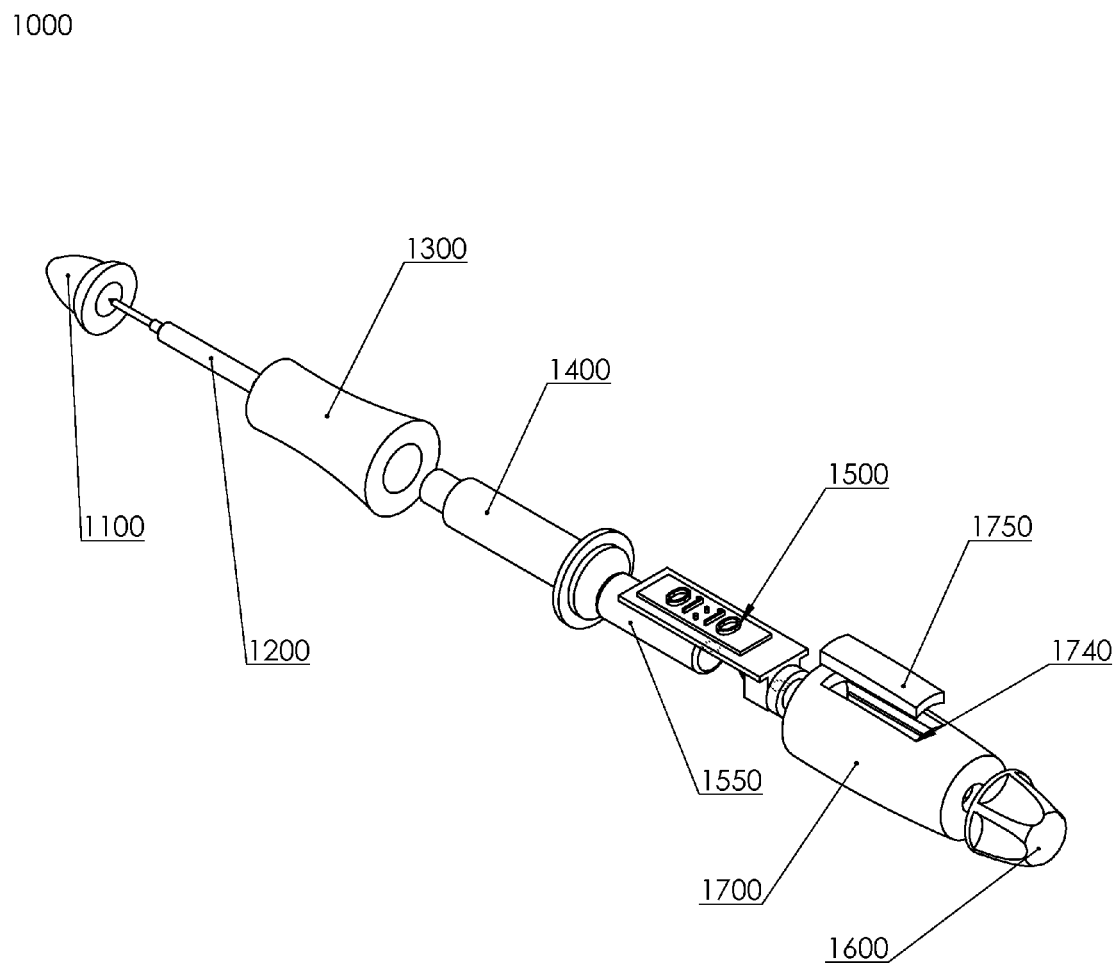
FIG. 2 shows an exploded view of the major assemblies of a counter pen.

Referring now to FIGS. 1 and 2 together, nose cone 1100 is a substantially conical member having an aperture extending through the long axis thereof sized and shaped to slideably accommodate the distal end portion of pen blank 1200 therein. The proximal-end portion of nose cone 1100 is operatively configured to be engaged upon the distal-end portion of grip body 1400. The engagement means can for instance be a threaded or bayonetted mount. Pen blank 1200 is a standard roller, ballpoint, gel, or marker cartridge, including for instance a Lamy M22 cartridge. According to certain embodiments of the present disclosure, there is a biasing spring disposed upon the distal-end portion of the pen blank 1200 and engaged against the interior wall of the nose cone.

Referring still to FIG. 2, grip 1300 is an elongated member composed of a compliant material, such as silicone or soft nylon, sized and shaped to be comfortably grasped in the fingers of a user and removably engaged upon the outer surface of a grip body 1400. Grip body 1400 is an elongated rigid member having a substantially annular cross-section and an engagement portion operatively configured to be coupled to the nose cone at the distal end thereof and an engagement portion operatively configured to be coupled to a pen body at the proximal end portion thereof.

Referring still to FIG. 2, a battery 1550 is shown, which is for instance a AAA cell battery. There is also shown a transparent screen 1750 disposed within a complementary aperture 1740 extending through pen body 1700.

Figure 3:
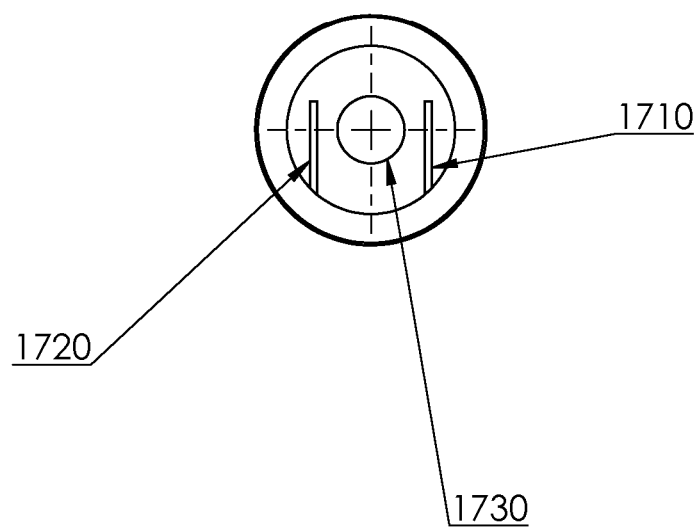
FIG. 3 shows an inside plan view of a counter pen body.

Referring now to FIG. 3, the interior of a pen body 1700 is shown, wherein there is a pair of rails 1710 and 1720 extending longitudinally therein leaving a space there-above to slideably engage upon circuit board 1500 and a space there-below sized and shaped to slideably engage upon battery 1550.

Figure 4:
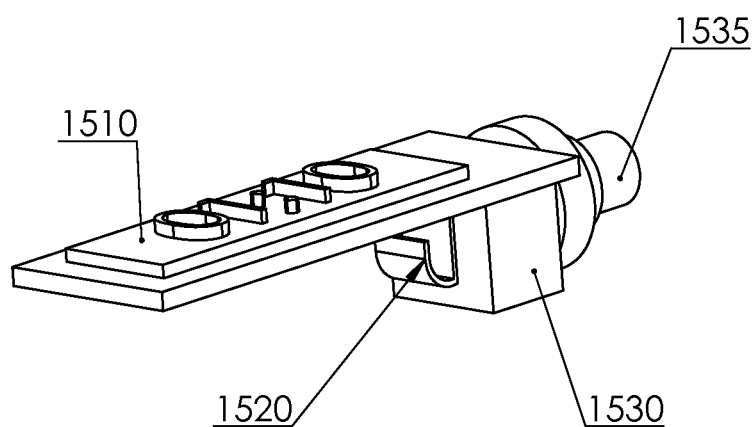
FIG. 4 shows an isometric view of a circuit board assembly.

Referring now to FIG. 4, a circuit board 1500 is shown, wherein circuit board 1500 has a digital display 1510 disposed upon a first face thereof, including for instance a 4 digit, 7 segment lcd display as shown in the figures. Screen 1510 may be selected from a screen topology known in the electronic arts, including for instance an e-ink matrix display, a 4 digit/7 segment LCD or LED, an LED or OLED matrix panel, or other suitable topology.

Digital display 1510 is oriented such that when circuit board 1500 is engaged upon rails 1710 and 1720, the digits upon display 1510 are visible through aperture 1740.

A battery spring terminal 1520 is disposed upon the second face of circuit board 1500 and oriented distally while being in electronic communication with screen 1510 and a micro-controller disposed within board 1500. There is a control wheel 1530 disposed upon the second face of circuit board 1500 and oriented facing proximally. According to certain embodiments of the present disclosure, control wheel 1530 is a rotary encoder having a spring-loaded push-button functionality built into its stem 1535. According to certain further embodiments fo the present disclosure, the function of the control wheel is achieved by at least one hall effect sensor disposed upon the circuit board and a corresponding magnet disposed upon the knob.

According to certain embodiments of the present disclosure, there is a toggle switch disposed upon the distal surface of circuit board 1500 which is reachable and may be actuated when grip body 1400 is separated from pen body 1700 (for instance to replace the battery). The toggle switch is operatively configured to flip the orientation of the figures on the display about the long axis of the device and direction of the knob function, such that the device may comfortably be used and read by both right and left-handed users.

Figure 5:
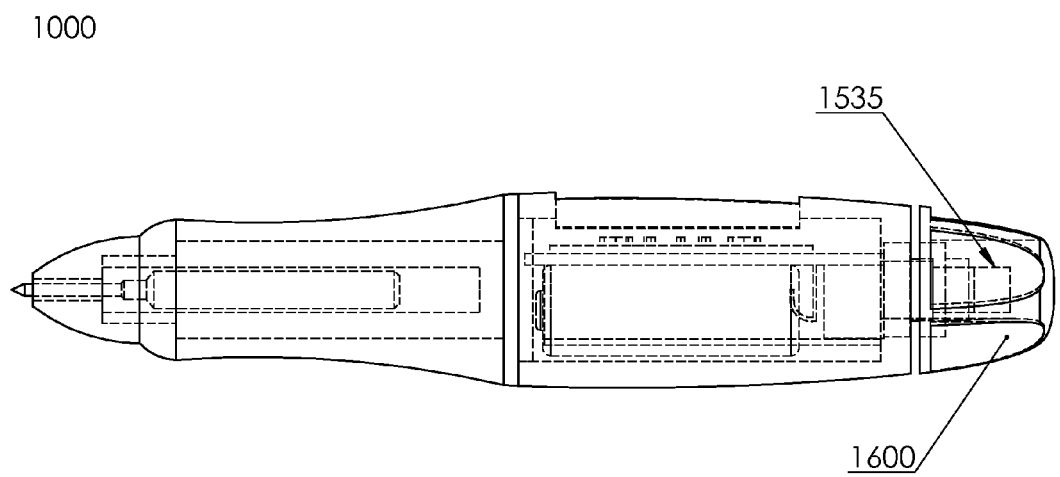
FIG. 5 shows a through side view of an assembled pen counter.

Referring now to FIG. 5, a through-view of the device is shown, wherein knob 1600 is frictionally engaged upon stem 1535.

Unless otherwise noted, the various components of the assembly described herein shall be manufactured from rigid materials known in the mechanical arts such as metal, polymers, fiber composites, or wood.

Although the figures have been simplified for illustrative purposes, there are further embodiments within the scope of the present disclosure wherein the distal tip of pen cartridge 1200 may be selectably retracted within nose cone 1100 by means of a twisting motion of the nose cone 1100 or grip 1300 or a slideable engagement mechanism mechanically coupled to the nose cone or a toggle on the grip. These mechanisms are commonly referred to as "twist pens", "slide pens" and "click pens" and are commonly known in the mechanical arts.

A method of using counter pen 1000 will now be described. Initially, the counter pen is provided in a first state, with all four digits of the display shown as "00:00" for both counts visible thereon and the knob disposed in a first position "A" along its rotation indicating a first team including for instance the home team is being recorded. In the course of a game, each time a player pitches, the user depresses the knob 1600, thereby incrementing the currently active count for the present inning and creating a display of "01:00". This process is repeated for each pitch in a given inning. At the end of the inning, the knob is rotated to a second position "B", indicating the second team is being recorded. At this point, the total pitch count for that inning is added to the total pitch count for a given team during the game. There may be a secondary indicia of the currently active team, with the indicia comprising a visual indicator on the screen, an LED disposed away from the screen, LED inside the stem 1535, graphical indicia printed on the knob or pen body, or acoustic indicia emitted from a speaker disposed on circuit board 1500. In the course of the present inning, each time a player pitches, the user depresses the knob 1600, thereby incrementing the currently active count thereby creating a display of "01:00". If a user desires to reset a count for a new game or new pitcher, they may depress knob 1600 for greater than 5 seconds, thereby returning that given count to "00:00."

When the knob 1600 is rotated back into the position indicative of the first team, the total count is displayed in the second visual register and the inning count is displayed in the first. For instance, if the visiting pitcher has pitched a total of 20 times during the game and four times during that specific inning, the display would read "04:20."

The preceding sections are illustrative of but one exemplary implementation of the claims appended below.

What is claimed is:

1. A counting pen, comprising an elongated pen body with a digital display visible thereupon, a rotary control element disposed near a first proximal end of the body in electronic communication with the digital display and a writing instrument disposed near a second distal end of the body wherein there are multiple active counts stored in the memory of the device which may be accessed by rotationally translating the control element into predetermined positions about its rotation relative to the body with each position corresponding to a count.

2. The counting pen of claim 1, wherein the active count may be incremented by depressing the control element along the long axis of the body, thereby temporarily decreasing the overall length of the device.

3. The counting pen of claim 1, wherein depressing the control element for an extended period of time resets a given count to zero.

4. The counting pen of claim 1, wherein there is a cumulative and active count stored within the memory of the device for each given rotational position.

5. The counting pen of claim 4, wherein both the cumulative and active count are visible upon the display.

6. The counting pen of claim 4, wherein incrementing the counter increments both the active and cumulative count.

7. The counting pen of claim 4, wherein rotating the controller resets the previously selected active count but not the cumulative count.

8. The counting pen of claim 4, wherein depressing the controller for an extended period of time resets both the cumulative and active counts.

9. The counting pen of claim 1, wherein there are longitudinal ridges disposed within the body which create a channel therebetween for slideably retaining a wet-cell battery.

10. The counting pen of claim 1, wherein there is a solar panel disposed upon the body and in electronic communication with the body.

11. The counting pen of claim 1, wherein there is a physical switch disposed thereupon which toggles the orientation of the display and control for right or left handed users.

12. The counting pen of claim 1, wherein there are two limits of rotation in the travel of the rotary control between which it may be toggled.

13. The counting pen of claim 1, wherein the display includes a backlight.

14. A counting pen, comprising an elongated pen body with a digital display visible thereupon, a rotary control element in electronic communication with the digital display disposed near a first end of the body and a writing instrument disposed near a second end of the body; wherein there are multiple active counts which may be accessed by rotationally translating the control element into one of at least two physical detents about the control element's rotation relative to the body and the control element is also a spring-loaded pushbutton which may be temporarily translated along the long axis of the body to increment the count.

15. A counting pen, comprising an elongated pen body with a digital display visible thereupon, a multi-position control element in electronic communication with the digital display disposed near a first end of the body and a writing instrument disposed near a second end of the body; wherein there are multiple active counts which may be accessed by translating the control element into one of a plurality of physical detents about the control element's path relative to the body and there is a spring-loaded pushbutton which may be temporarily translated along the long axis of the body to increment the count.

* * * * *